Jan. 24, 1956  R. L. PAWSAT  2,731,854
BICYCLE PEDALS
Filed Sept. 14, 1954

INVENTOR.
RUBEN L. PAWSAT
BY
Zugelter & Zugelter
Attys.

United States Patent Office 2,731,854
Patented Jan. 24, 1956

2,731,854
BICYCLE PEDALS

Ruben L. Pawsat, Maysville, Ky.

Application September 14, 1954, Serial No. 456,039

3 Claims. (Cl. 74—594.4)

This invention relates to bicycle pedals and more particularly to the construction of the foot grips therefor.

There is an increasing demand by bicycle manufacturers or bicycle parts manufacturers, but particularly those who produce pedals, that the pedals be provided with foot grips made of plastic, that is, a synthetic form of rubber, or a rubber-like material. Such materials are much more expensive than rubber. Therefore, in order that the pedal manufacturer may be competitive when using foot grips of plastic material, an economical use of the latter must be effected without sacrificing strength and durability of the pedal.

It is therefore an object of this invention to provide a bicycle pedal provided with plastic foot grips which are so constructed that a relatively small volume of plastic is required per pedal, but without sacrificing strength, durability, and functional characteristics of the pedals.

Another object of the invention is to provide a pedal having means whereby a plastic foot grip having a relatively low volume of plastic may be used, the grip being provided with a bore for accommodating a retaining bolt bearing insert whereby a bolt of relatively small diameter may be used, so that the overall cost of the grip is competitive with the old style rubber foot grips.

The above and other objects of the invention will be apparent to those of ordinary skill in the art to which the invention pertains, from the following description and the drawing.

Figure 1:
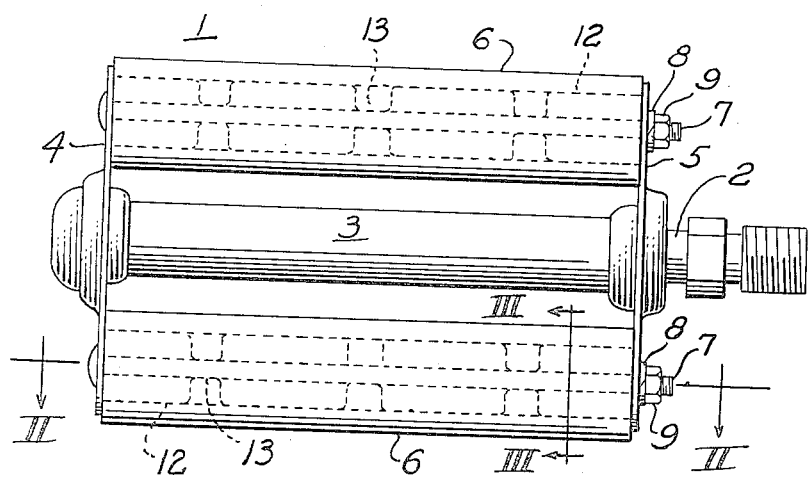
Figure 1 is a plan view of a foot pedal for bicycles arranged and constructed in accordance with an embodiment of the invention.

In Fig. 1 of the drawing a bicycle foot pedal 1 is illustrated that comprises the usual or customary spindle 2 which is screwed into the sprocket gear crank of the bicycle. The spindle extends through a housing 3 having at the ends thereof end plates 4 and 5. The pedal is provided with grips 6 of similar construction which are held in place between the end plates or retainers 4 and 5 by means of through bolts 7 and lock washers 8 and nuts 9.

Figure 2:
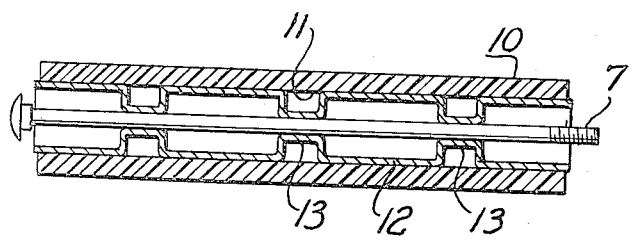
Fig. 2 is a view in section taken on line II—II of Fig. 1.
Figure 3:
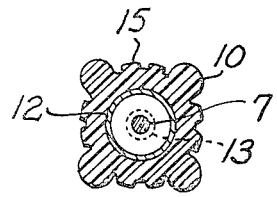
Fig. 3 is a view in section taken on a line III—III of Fig. 1.

Figs. 2 and 3 illustrate the construction of the grips 6. As there shown, the grip comprises a grip bar 10 of plastic which is flexible and rubber-like in its physical characteristics, but which is tougher and perhaps harder than rubber ordinarily used in bicycle pedals. The bar 10 has a bore 11 of relatively large diameter accommodating a tubular metal member 12 having a plurality of spaced necked-in, annular grooves 13 that form centering or guide bearings for the through bolts 7. As shown, the inside diameter of each necked-in portion 13 is slightly greater than the outside diameter of the through bolt 7 so that the bolt will pass through the member 12 without difficulty. The guide bearings distribute the load on the pedals over the length of each bolt 7.

As shown in Fig. 2, member 12 is slightly longer than the grip 10, so that when the assembly of grip 10 and member 12 is placed between the plates 4 and 5, the bolt 7 passed therethrough, and the lock washer 8 and the nut 9 threaded onto the bolt, the end members 4 and 5 will abut firmly against the ends of member 12, thereby avoiding unnecessary or undue distortion of the grip 10. As shown in Fig. 3, the shape of the grip bar 10 may take any desired configuration. The one shown is a modified square provided with teeth-like formations 15 to increase the traction between the foot and the grip. The sectional view of Fig. 3 shows how the member 12 fits the bore of the grip bar 10 and how the necked-in portions provide centering bearings for the through bolt 7.

It will be apparent also, by inspection of Figs. 2 and 3, that the actual volume of material in the grip bar 10 is considerably less than if the grip bar 10 were solid and provided with a bore only sufficiently large to accommodate the diameter of bolt 7.

Having thus described the invention, it will be apparent to those of ordinary skill in this art that the illustrated embodiment admits of modification and change without departing from either the spirit or the scope of the invention.

Therefore, what is claimed as new and desired to be secured by Letters Patent is:

1. A foot grip for a bicycle pedal which comprises an elongated tubular grip member of rubber-like material having an axial bore therethrough, the diameter of the bore being substantially greater than the thickness of the walls of the grip member, a tubular member in said bore, the outer surface of said tubular member frictionally engaging the wall of the bore, said tubular member having a plurality of inwardly extending annular spaced grooves to provide spaced guide bearings, and a retaining bolt extending through the tubular member, the diameter of said bolt being substantially equal to the inner diameter of said guide bearings.

2. A bicycle pedal comprising an elongated hollow tread member of plastic material of rubber-like character, a central support member extending through the tread member, and a hollow elongated intermediate member having spaced bearings on its outer surface for contacting the tread member and spaced bearings on its inner surface for contacting the central support member, said bearings being spaced to provide alternate bearing contacts of the intermediate member on the tread member and on the central support member, whereby to provide a cellular, light weight pedal of sturdy construction.

3. A bicycle pedal foot comprising a bolt like support member, an intermediate tubular member mounted for rotation on the support, said tubular member comprising a series of constricted portions and a series of enlarged portions spaced by the constricted portions, the constricted portions having aligned bores for receiving and mounting the support member, the inner surfaces of the bores providing bearing surfaces for the support member, the enlarged portions of the intermediate member having aligned outer surfaces extending in substantial parallelism with the axis of the support member, and an elongated hollow plastic grip member having rubber like characteristics having its inner surface in engagement upon the outer surfaces of the enlarged portions of the intermediate member, and the external face of the grip member substantially enclosing the intermediate member and providing a tread surface for an operator's foot.

References Cited in the file of this patent

UNITED STATES PATENTS

| | | |
|---|---|---|
| 1,567,775 | Wagner | Dec. 29, 1925 |
| 2,226,424 | Bullock | Dec. 24, 1940 |